Oct. 19, 1965 F. A. DE POLLIER 3,212,330
MEASURING APPARATUS FOR PARTICULATE MATERIAL STREAMS
Filed Feb. 9, 1962
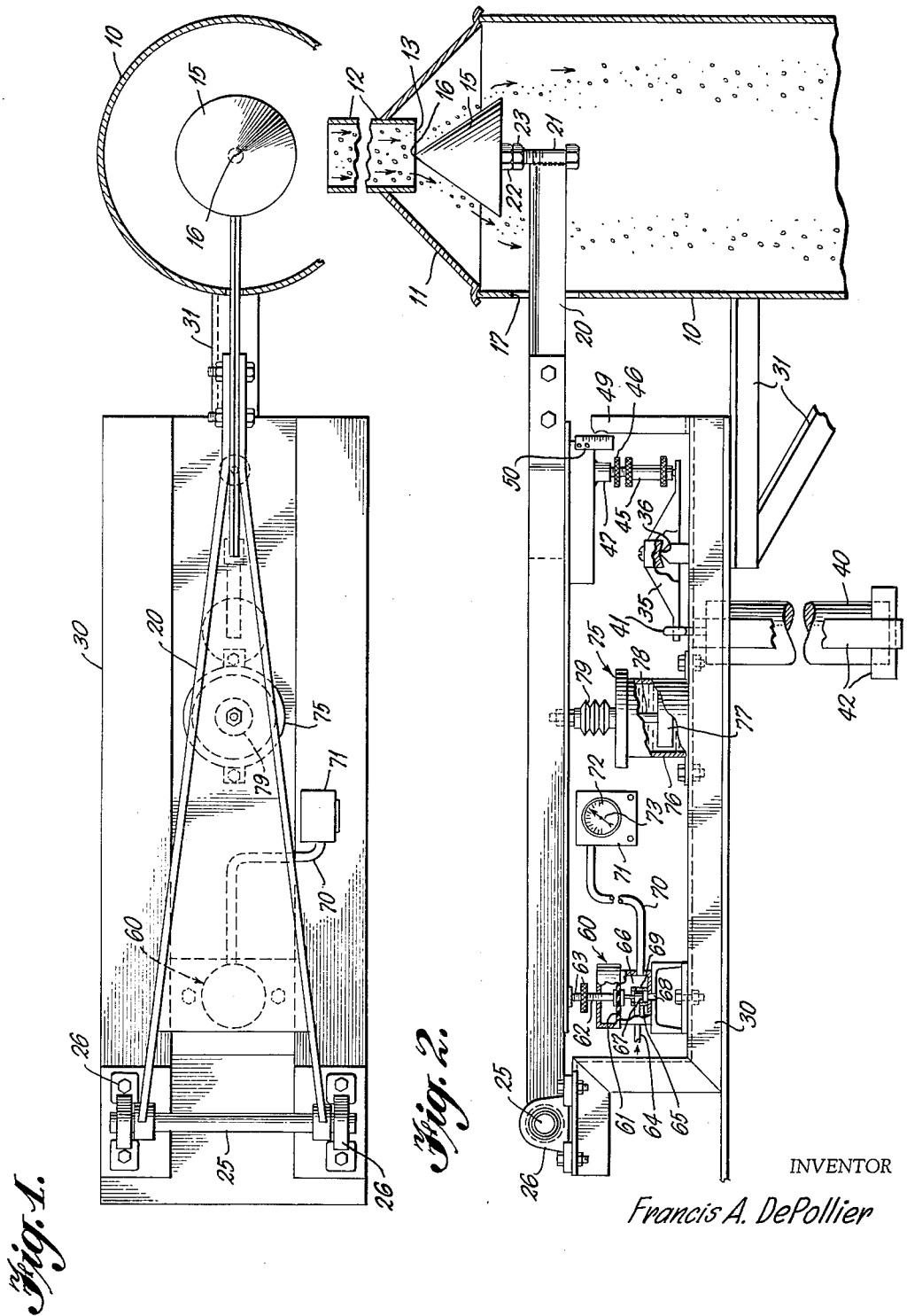
INVENTOR
Francis A. DePollier United States Patent Office 3,212,330
Patented Oct. 19, 1965

3,212,330
MEASURING APPARATUS FOR PARTICULATE MATERIAL STREAMS
Francis A. De Pollier, Lakeland, Fla., assignor to International Minerals & Chemical Corporation, a corporation of New York
Filed Feb. 9, 1962, Ser. No. 172,310
1 Claim. (Cl. 73—228)

This invention relates generally to the art of measuring the flow rate of streams of particulate material. More specifically, the invention is directed to providing apparatus for continuous measurement of the weight of particulate material flow in a stream of particulate material and accurately reflect the flow rate changes in the stream.

Although there are many structures available for determining the flow rate of a stream of liquid, measurement of the flowing weight rate of a stream of particulate material presents special problems which make it difficult to secure effective measurement of the flow rate of such materials. Presently available continuous weighing devices for particulate materials using conveyor belts and exposed weighing beams are subject to substantial inaccuracies caused by their exposure to fumes, dust, material spillage and corrosive atmosphere existent in many chemical operations wherein particulate materials are handled. For example, the exposed weighing beam tends to collect dust resulting in inaccurate readings being indicated for the flow rate of the particulate material passing through the apparatus. Conveyor belts used in continuous weighing devices for particulate material may become stretched or the tension therein changed due to buildup of foreign material on the head or tail pulleys over which the conveyor belt passes. Also with conveyor belt weighing devices, accurate weight measurement requires that the belt speed remain constant irrespective of variations in the load of particulate material carried thereby. Various complicated and intricate mechanisms have been developed in an attempt to maintain the belt speed constant in this type of weighing structure. The repair, maintenance and adjustment of such mechanisms requires skilled, trained technicians and also involves prohibitive periods of down time for the equipment to carry out such repair, maintenance and adjustment.

It is a primary object of the invention invention to provide improved apparatus for measuring the flow rate of a stream of particulate material.

It is another object of the instant invention to provide apparatus of particularly simple and rugged construction wherein accuracy and reliability of operation is obtained in use of the apparatus to measure the flow rate of a stream of particulate material.

A further object of the instant invention is to provide a continuous weight measuring apparatus for handling flowing streams of particulate material and determining the flow rate per unit of time wherein the particulate material passes in a free falling stream and at the end of such free fall is impinged against a cone with impact on the cone caused by such impinging being indicative of the flow rate of the stream of particulate material.

It is also an object of the instant invention to provide a continuous measuring apparatus for a stream of particulate material wherein the stream of material passes through a vertical free fall of predetermined height and is impinged against the vertex of a cone mounted at the bottom of such free fall height with the momentum forces applied to such cone by reason of the impingement of the free falling stream thereagainst being translated through a balance beam mechanism to give an indication of the rate of flow of particulate material.

Another object of the instant invention involves the provision of a continuous measuring apparatus in accordance with the above object wherein the cone is mounted on one end of a pivotally supported beam with a housing enclosing the cone and with the beam and components related to such beam mounted exteriorly of the housing to be protected from exposure to dust and particles of the particulate material stream.

The above and other objects and novel features of the instant invention will be readily apparent from the following description taken in connection with the accompanying drawings. It is to be expressly understood that the drawing is for the purpose of illustration and is not intended to define the limits of the invention but rather to merely illustrate a preferred embodiment and structure incorporating the features of the instant invention.

In the accompanying drawing forming a part of this specification and wherein like reference numerals are employed to designate like parts:

FIGURE 1 is a plan view of the measuring apparatus with the housing shown in section to illustrate the position of the impaction cone disposed within the housing; and FIGURE 2 is a side elevational view showing the drop pipe, housing cover and housing of the apparatus in section and with parts of other components broken away.

The apparatus of the instant invention is shown on the drawing with the weighing beam and mechanism associated therewith mounted in assembled relation to a drop pipe for the stream of particulate material and a housing disposed beneath the drop pipe. Thus there is provided a housing 10 which as illustrated, may be cylindrical in form. The housing should have ample cross sectional area to accommodate flow of the stream of particulate material therethrough without in any way interferring with passage of the stream of material across the impaction cone which is mounted in the housing as will be described hereinafter. The housing 10 serves to conduct the stream of particulate material from the impaction cone and may be suitably coupled at its lower end to feed the material to a conduit, conveyor belt, etc. depending upon the future use or disposition that is to be made of the stream of particulate material.

The housing 10 includes a housing cover 11 which as illustrated supports a drop pipe 12. Drop pipe 12 is disposed with its axis vertical and the particulate material is conveyed in a free falling stream through such pipe. The vertical height of drop pipe 12 is important in that it enters into calibration of the rate measuring function of the apparatus since the height of free fall of the stream particles will determine their momentum when they reach the impaction cone and consequently the magnitude of force imparted to the cone.

The particulate material is discharged into the upper end of the drop pipe 12 in a manner to fall freely in the form of a stream throughout the height of the drop pipe. The drop pipe 12 terminates in a discharge opening 13 at its lower end. It will be readily appreciated that for a given height in the overall length of drop pipe 12 the particles in their free fall through the drop pipe will acquire a certain velocity and depending upon the mass of each particle will have a predetermined momentum.

An impaction cone 15 is mounted directly beneath the discharge opening 13 of drop pipe 12 with the vertex 16 of such cone aligned with the vertical axis of drop pipe 12 and disposed in the horizontal plane of the discharge opening 13 of such drop pipe.

The cone configuration has been found to be particularly important in obtaining accurate measurement of the flowing stream of particulate material in that material flow occurs across the cone surface without build up and thus accurate flow readings for a wide range of flow rates may be obtained.

The housing 10 is provided with an opening 17 in its side wall. A horizontal beam 20 extends through opening 17 into housing 10 with the inner end of such beam being disposed beneath the lower end of drop pipe 12. A bolt 21 is suitably secured as by welding to the end beam 20 with its threaded end up and such end threaded into a nut 22 welded to the base plate of cone 15. A lock nut 23 may be threaded onto the end of bolt 21 to be drawn up tight against the nut 22 carried by cone 15 and thereby securely fasten the cone onto bolt 21 and consequently onto the end of beam 20.

In the illustrated embodiment the opposite end of beam 20 is provided with a shaft 25 extending normal to the length of beam 20. Shaft 25 is journalled in bearings 26. The bearings 26 are mounted on a frame 30. This frame provides a supporting base for the mechanisms associated with the beam 20 that are described hereinafter and as illustrated the frame 30 may be suitably supported on a bracket 31 fastened to the exterior wall of housing 10 so as to rigidly support the beam and associated mechanisms in proper operative relation to the housing 10. Although beam 20 has been shown pivoted at one end it will be appreciated that the beam may be fulcrumed intermediate its ends if desired with appropriate relocation or repositioning of the associated mechanisms relative to the beam as will be well understood by those skilled in the art.

Means for counterbalancing the static weight of beam 20 and cone 15 carried thereby is provided supported on the frame 30. This means includes a poise beam 35 which as shown by the cutaway portion on FIGURE 2 is supported on a knife edge 36 to swing in a generally vertical plane, the knife edge 36, being mounted on frame 30. A tare weight 40, provided with an eye bolt 41, is suspended from one end of beam 35 by the eye bolt 41 being engaged with the beam end. The tare weight hangs down through an opening in frame 30 and the frame is provided with an appropriate protecting cage 42 which encloses the opposite sides and bottom of the tare weight 40 to minimize the possibility of its being jarred and thereby interrupt accuracy of the flow rate reading.

An adjustable length sleeve 45 having a knurled length-adjusting member 46 is interposed between the end of poise beam 35 opposite tare weight 40 and the underside of beam 20. A suitable pad 47 is provided on the underside of beam 20 to rest on the upper end of adjustable sleeve 45 and its length-adjusting member 46.

It will be seen that the static weight of the beam acting about the pivotable support of shaft 25 and the static weight of cone 15 carried on the beam 20 can be effectively counterbalanced by appropriate selection of the weight of tare weight 40, the tare weight acting through the poise beam 35. Also by adjusting the length of sleeve 45 by rotating knurled member 46 relative to the sleeve in the proper direction, the beam 20 may be located in the desired static position to extend horizontal and properly locate the vertex 16 of cone 15 in the plane of discharge opening 13 of the drop pipe 12.

A pointer 49 is mounted on frame 30 to extend upwardly and lie along a graduated scale 50. Scale 50 is secured to beam 20 so as to be movable therewith. Thus the position of the graduations on scale 50 relative to stationary pointer 49 may be observed to determine the need for adjustment of the beam position as to accurately locate the beam at the desired nul-balance position. Proper adjustment of the position of beam 20 can be effected by manipulation of the adjustable length sleeve 45. When the apparatus is in use the position of pointer 49 relative to scale 50 may be observed as an indication of the beam properly operating at this desired nul-balance position.

As referred to hereinabove, the impact of the stream of particulate material against the cone 15 provides a force which may be interpreted as representing the flow rate of such stream. The force imparted by such impact to cone 15 is transmitted to beam 20 tending to swing the beam downwardly in a vertical plane about shaft 25. The downward swinging movement of beam 20 or tendency to move in this direction as represented by the stream impact force may be employed to indicate variations in or the magnitude of the flow rate of material.

A motion transmitter 60 is mounted on frame 30 beneath the beam 20 adjacent the swing axis for the beam formed by shaft 25. Although a variety of motion translating devices may be employed including pneumatic, electronic pressure transducers, strain element transducers, etc., there has been illustrated on the drawing a transmitter 60 which includes a diaphragm 61 with a rod 62 extending upwardly from the diaphragm and passing through the top of the casing of transmitter 60. Rod 62 is externally threaded and mounts a knurled adjusting screw 63 which engages the underside of beam 20. The adjusting screw 63 permits varying the vertical height of the transmitter rod 62 to accommodate the space between the frame 30 and the underside of beam 20. Also, manipulation of screw 63 may be conveniently employed to calibrate the zero setting for the flow rate meter described below.

A suitable transmitter for use in conjunction with this apparatus may be found in the "Weighing Diaphragm Unit" T–1 Air Transmitter, manufactured by Builders-Providence, Inc., Providence, Rhode Island.

On the drawing a simplified transmitter 60 has been illustrated for ease in description of the functioning of this component. As shown, low pressure air is supplied through tube 64 which tube communicates with a port on the interior of a cylindrical valve casing 65 mounted in the chamber 66 beneath diaphragm 61. A cylindrical valve member 67 connected to move with the diaphragm 61 is slidable within casing 65. The bottom of casing 65 communicates with atmosphere through a port 68 while a port 69 extends from the interior of the valve casing 65 to communicate with the chamber 66.

A tube 70 extends from the casing of transmitter 60 and communicates with the chamber 66 on the underside of diaphragm 61 which is a closed chamber within the transmitter casing. This tube leads to an appropriate meter 71 which carries a gauge connected to respond to pressure variations within chamber 66 transmitted through tube 70 resulting from the control by valve member 67 of air flow into chamber 66 through tube 64 and exhaust through port 68. Of course these pressure variations are created by movements of diaphragm 61 which is connected to move valve member 67 while the diaphragm movements are in turn caused by swinging movements of beam 20 transmitted through rod 62 and adjusting screw 63.

The air pressure within chamber 66 is increased when diaphragm 61 slightly depresses valve member 67 to admit air into the chamber from tube 64. In this state the valve member 67 closes ports 68 and 69 against exhaust of air to atmosphere from chamber 66. Similarly when diaphragm 61 rises slightly above the centered position as shown on the drawing, air flow from tube 64 is blocked by valve member 67 while air exhausts through port 69 beneath member 67 and through port 68 to reduce the air pressure in chamber 66. In the case of movement of diaphragm 61 in either direction the force transmitted through beam 20 which caused depression or release of diaphragm 61 is compensated by the change in pressure in chamber 66 which pressure returns the beam 20 to its nul-balance position thereby centering the valve member 67 to close the valve ports against inflow or outflow of air from chamber 66. It will be recognized that the air control valve on the drawing is shown quite simplified.

The meter 71 may take any suitable form and its functioning in indicating changes in pressure within tube 70 need not be further described. As will be described more fully hereinafter, the graduations 72 traversed by the pointer 73 on meter 71 may be so interrelated to one another and to the extent of operation of the meter in response to a particular pressure change in tube 70 and chamber 66 as to provide a direct reading indicative of the flow rate of particulate material through the apparatus. Thus by proper calibration of the meter scale graduations 72 with other parameters of the apparatus, the meter 71 can provide a direct reading in weight per unit of time of the particulate material flowing through the apparatus.

In order to prevent rapid swinging movement of beam 20 as might be caused by sudden surges in the rate of material flow through the apparatus, a dash pot 75 is mounted on frame 30 beneath beam 20. The dash pot includes a container 76 which retains a body of liquid such as oil. A disc 77 slightly smaller in diameter than the internal diameter of container 76 is immersed in the body of liquid with such disc being mounted on a rod 78 which extends through the top wall of container 76 and through a bellows seal 79 with the upper end of the rod connected to beam 20. By providing the dash pot 75 any tendency to rapid swinging movement of the beam 20 will be damped.

From the structure described the operation of the measuring apparatus should be readily apparent. The particulate material, the flow rate of which is to be measured, is discharged into the upper end of drop pipe 12 whereupon it passes downwardly in a free falling stream through the length of pipe 12 exiting from the pipe at the discharge opening 13. The stream impinges against cone 15 and a portion of the momentum of the particles making up the material stream is transmitted to the cone in the form of a force acting downwardly on the cone and thereby tending to depress the beam 20. It is particularly important that the vertical swinging movements of the beam 20 be quite restricted in magnitude since for reliability and accuracy in indicating variations in flow rate, it is important that the vertex 16 of the cone 15 be maintained in a particular position relative to the discharge opening 13.

With the motion transmitter 60 mounted closely adjacent the swing axis for the beam, small downward movement of beam 20 will depress diaphragm 61, increasing the pressure in chamber 66 by valve member 67 opening air supply pipe 64. This increased pressure acts on meter 71 and thereby moves pointer 73 across the graduations 72. By appropriate calibration of the dimensional relationships between the elements of the apparatus and proper selection of the meter 71, the graduations 72 may be spaced on the meter face to directly indicate varying flow rates of particulate material passing through the apparatus such as in pounds or tons per hour. The increased pressure in chamber 66 will also act on the underside of diaphragm 61 to raise the beam 20 to its original position and terminate flow of air into chamber 66.

Each time the rate of material feed in the free falling stream increases, the impingment force on cone 15 will increase, beam 20 will move downwardly, diaphragm 61 will be depressed, the air pressure in chamber 66 will increase, and the reading on meter 71 will reflect the corresponding increase in flow rate. Similarly, when the rate of material flow decreases, the beam 20 will be subjected to less downward force through cone 15 and the diaphragm 61 will rise thereby moving valve member 67 to open port 69 and bleed out air pressure from chamber 66. The meter 71 will reflect the corresponding decrease in flow rate of particulate material as represented by the decreased pressure in chamber 66.

It must be mentioned that various characteristics of the particulate material such as particle size, flowability, particle shape, etc. will have an effect on the response of cone 15 and beam 20 to a particular stream weight rate of flow. Thus the apparatus must be calibrated for handling streams of a material having particular characteristics and thereafter the apparatus may be reliably used in measuring variations in flow rate of this material. However, the feature of providing the cone 15 to receive the impact of the falling stream is important in materially minimizing variations in response of the apparatus in handling streams of different types of particulate materials. The relatively steep inclination of the cone wall in relation to the downwardly falling stream, the substantially smaller area of the drop pipe 12 to the area of the base of cone 15, and other dimensional relationships as shown in FIGURE 2 all cooperate to make the apparatus more nearly reliable in measuring flow rates irrespective of the particular material making up the stream being measured. In any event the adjustability of the meter 71, transmitter 60, tare weight 40, etc. may be readily employed to accommodate the apparatus to different types of material.

Although it will be fully appreciated that this invention may be embodied in apparatus having various dimensional sizes, the dimensions of one embodiment found to be particularly satisfactory may be mentioned. In this embodiment drop pipe 12 had an internal diameter of 4 inches and a length of 4 feet while cone 15 mounted to operate with its vertex 16 aligned with the axis of pipe 12 and principally in the plane of the discharge end 13 of pipe 12 had a base diameter of 7 inches and a height of 5 inches.

Although I have shown and described a certain embodiment of my invention, it will be understood that I do not wish to be limited to the exact construction shown and described, but that various changes and modifications may be made without departing from the spirit and scope of the invention as defined in the appended claim.

I claim:

Apparatus for measuring the flow rate of a stream of particulate material comprising a cylindrical drop pipe having a predetermined open length of uniform diameter, said pipe being mounted with the axis thereof vertical to convey the particulate material forming an inlet opening at the upper end thereof in a free falling stream, said pipe terminating in a discharge opening disposed in a horizontal plane at the lower end of said pipe, a beam pivotally mounted to swing in a vertical plane with the beam extending beneath said discharge opening, a cone having a base diameter substantially greater than the diameter of said cylindrical drop pipe, said cone being mounted on said beam with the vertex of the cone aligned with the vertical axis of said pipe and lying generally in the horizontal plane of said discharge opening to have the entire free falling stream of particulate material impinge thereagainst, and means connected to be actuated by swinging movements of said beam for indicating the flow rate of the stream of particulate material.

References Cited by the Examiner

UNITED STATES PATENTS

| | | | |
|---|---|---|---|
| 2,578,118 | 12/51 | Wood | 73—434 |
| 2,632,329 | 3/53 | Zuehlke | 73—228 |
| 3,056,293 | 10/62 | Ofner | 73—198 |
| 3,067,621 | 12/62 | Fairhurst | 73—433 |
| 3,115,777 | 12/63 | Hochreiter | 73—228 X |

RICHARD C. QUEISSER, *Primary Examiner.*

ROBERT L. EVANS, *Examiner.*